United States Patent
Iqbal et al.

(10) Patent No.: US 12,117,577 B2
(45) Date of Patent: Oct. 15, 2024

(54) APPARATUS AND SYSTEM FOR IDENTIFYING SEISMIC FEATURES

(71) Applicant: King Fahd University of Petroleum and Minerals, Dhahran (SA)

(72) Inventors: Naveed Iqbal, Dhahran (SA); Abdullah Othman, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 18/641,972

(22) Filed: Apr. 22, 2024

(65) Prior Publication Data

US 2024/0310543 A1   Sep. 19, 2024

Related U.S. Application Data

(63) Continuation of application No. 17/667,173, filed on Feb. 8, 2022.

(51) Int. Cl.
   *G01V 1/28*   (2006.01)
(52) U.S. Cl.
   CPC ........ *G01V 1/288* (2013.01); *G01V 2210/123* (2013.01); *G01V 2210/324* (2013.01)
(58) Field of Classification Search
   CPC ................... G01V 2210/123; G01V 2210/324
   See application file for complete search history.

(56) References Cited

U.S. PATENT DOCUMENTS

| | | | |
|---|---|---|---|
| 10,921,471 B2 | 2/2021 | Lolla et al. | |
| 2011/0096626 A1* | 4/2011 | Zhu | G01V 1/288 367/38 |
| 2019/0302291 A1* | 10/2019 | Lolla | G01V 1/288 |

(Continued)

FOREIGN PATENT DOCUMENTS

| | | | | |
|---|---|---|---|---|
| WO | WO-2022261641 A1 * | 12/2022 | | |
| WO | WO-2023204959 A1 * | 10/2023 | ........... | G06T 7/0012 |

OTHER PUBLICATIONS

Mezyk, et al.; Automatic Image-Based Event Detection for Large-N Seismic Arrays Using a Convolutional Neural Network; Remote Sensing 2021; Jan. 23, 2021; 18 Pages.

(Continued)

*Primary Examiner* — Krystine E Breier
(74) *Attorney, Agent, or Firm* — Oblon, McClelland, Maier & Neustadt, L.L.P.

(57) ABSTRACT

An apparatus, a method, and a non-transitory computer readable medium for event detection of passive seismic data are disclosed. The apparatus includes processing circuitry extracts features from the passive seismic data based on a backbone subnetwork of a residual deep neural network. The processing circuitry generates bounding box proposals for a region of interest (ROI) in the passive seismic data based on the extracted features being input to a region proposal network of the residual deep neural network. The processing circuitry classifies the bounding box proposals into two groups. Each bounding box proposal in a first group indicates that a corresponding seismic signal presents in the ROI. Each bounding box proposal in a second group indicates that no seismic signal presents in the ROI. The processing circuitry determines at least one seismic signal in the ROI from the first group of bounding box proposals.

11 Claims, 12 Drawing Sheets

(56) References Cited

U.S. PATENT DOCUMENTS

| | | | |
|---|---|---|---|
| 2019/0324166 A1* | 10/2019 | Lolla | G01V 1/42 |
| 2020/0217979 A1* | 7/2020 | Iqbal | G01V 1/366 |
| 2021/0142068 A1* | 5/2021 | Aliamiri | G06V 20/47 |
| 2022/0148284 A1* | 5/2022 | Kim | G06T 7/11 |
| 2023/0099521 A1* | 3/2023 | Yang | G06F 18/254 |
| | | | 382/173 |
| 2024/0005628 A1* | 1/2024 | Cai | G06V 10/811 |

OTHER PUBLICATIONS

Wang, et al. ; Data-driven Microseismic Event Localization: an Application to the Oklahoma Arkoma Basin Hydraulic Fracturing Data ; IEEE Transactions on Geoscience and Remote Sensing, 1-1 ; 2021 ; 27 Pages.

Wamriew, et al. ; Microseismic Events and Velocity Model Inversion from Microseismic Data Acquired by Distributed Acoustic Sensing Array ; Sensors ; Oct. 5, 2021 ; 17 Pages.

* cited by examiner

APPARATUS AND SYSTEM FOR IDENTIFYING SEISMIC FEATURES

CROSS-REFERENCE TO RELATED APPLICATIONS

The present application is a Continuation of U.S. application Ser. No. 17/667,173, pending, having a filing date of Feb. 8, 2022.

STATEMENT REGARDING PRIOR DISCLOSURE BY INVENTORS

Aspects of the present disclosure were described in A. Othman, N. Iqbal, S. M. Hanafy and U. B. Waheed, "Automated Event Detection and Denoising Method for Passive Seismic Data Using Residual Deep Convolutional Neural Networks" published on *IEEE Transaction on Geoscience and Remote Sensing*, vol. 60, pp. 1-11, 2022, Art no. 5900711.

BACKGROUND

Technical Field

The present disclosure is directed to a system and method for detecting and de-noising passive seismic events.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Passive seismic events have recently received more interest for site characterization using concepts and approaches from earthquake localization methods such as those described by R. Qian and L. Liu in "Imaging the active faults with ambient noise passive seismics and its application to characterize the Huangzhuang-Gaoliying fault in Beijing Area, northern China," Engineering Geology, vol. 268, no. 1, p. 105520, 2020. Passive seismic applications include fault plane solutions, moment tensor inversion and imaging-based methods, for example diffraction stacking, which have replaced traditional methods of seismic source location, as described by V. Rodriguez, Y. J. Gu, and M. D. Sacchi in "Resolution of Seismic-Moment Tensor Inversions from a Single Array of Receivers," Bulletin of the Seismological Soceity of America, vol. 101, no. 6, pp. 2634-2642, 2011. Meanwhile, diffraction seismic events are considered as a link between active and passive seismics. Diffraction methods are related to seismic interferometry methods, the study of which has deepened and broadened the understanding of much subtler characteristics in recorded ambient noise. Cross correlation based methods have also been used to retrieve body-wave arrivals from passive seismics. As described by N. M. Shapiro and M. Campillo in "Emergence of broadband Rayleigh waves from correlations of the ambient seismic noise," Geophysics Research Letters, vol. 31, no. L07614, 2004, and by K. G. Sabra et al. in "Surface wave tomography from microseisms in Southern California," Geophysics Research Letters, vol. 32, no. 14, 2005, surface waves are retrieved from recorded ambient noise which are generated by surface and near-surface source locations. A detailed description on how to extract surface wave information from ambient noise data is described by G. D. Bensen et al. in "Processing seismic ambient noise data to obtain reliable broad-band surface wave dispersion measurement," Geophys. J. Int., vol. 169, pp. 1239-1260, 2007. These retrieved surface waves are used as input data for regional tomographic imaging, basin characterization, monitoring changes in volcano chambers, and ground subsidence of a mined area, as described by N. M. Shapiro et al. in "High resolution surface wave tomography from ambient seismic noise," Science, vol. 307, pp. 1615-1618, 2005, by H. Yao et al. in "Surface-wave array tomography in SE Tibet from ambient seismic noise and two-station analysis—I. phase velocity maps," Geophys. J. Int., vol. 166, no. 2, pp. 732-744, 2006, by C. Past´en et al. in "Deep characterization of the Santiago Basin using HVSR and cross-correlation of ambient seismic noise," Eng. Geol., vol. 201, pp. 57-66, 2016, by C. Sens-Schonfelder and U. Wegler in "Passive image interferometry and seasonal variations of seismic velocities at Merapi volcano, Indonesia," Geophys. Res. Lett., vol. 33, no. L21302, 2006, and by R. Czarny et al. in "3D S-wave velocity imaging of a subsurface disturbed by mining using ambient seismic noise," Eng. Geol., vol. 251, pp. 115-127, 2019.

Passive seismic events that have low magnitude activity within the earth are referred to as microseismics. The strength of the microseismic recordings are variable, reportedly in a range between −3 and −1, as described by S. C. Maxwell et al. in "Microseismic deformation rate monitoring," SPE Annual Technical Conference, September 2008. Microseismic events are used to gain information about reservoir dynamics and geomechanics and to assess the viability and efficacy of geologic storage of carbon dioxide, as described by M. Kendall et al. in "Microseismicity: Beyond dots in a box—Introduction," Geophysics, vol. 76, no. 6, pp. 3-5, 2011, and by J. P. Verdon in "Microseismic Monitoring and Geomechanical Modelling of CO2 Storage in Subsurface Reservoirs," PhD thesis, 2010.

Accuracy and precision for microseismic source localization depend on the signal-to-noise ratio (SNR) of the received signal and the spatial resolution of the receiver sensors with respect to the hypocenter, as described by Y. Jiang et al. in "Automatic microseismic event detection using multiscale morphological characteristic function," IEEE Transactions on Geoscience and Remote Sensing, vol. 58, no. 5, pp. 3341-3351, 2020, and by W. Zhu et al. in "Seismic signal denoising and decomposition using deep neural networks," IEEE Transactions on Geoscience and Remote Sensing, vol. 57, no. 11, pp. 9476-9488, 2019. While underground sensors have a higher SNR and are able to accurately detect the depth of a passive seismic event, precisely locating a hypocenter is quite challenging given a single monitoring well, as descrbied by L. Eisner et al. in "Comparison of surface and borehole locations of induced seismicity," Geophysical Prospecting, vol. 58, pp. 809-820, 2010. The epicentral error when using a downhole array of sensors usually increases as a function of distance from the monitoring well. However, surface arrays are more flexible with their placement in different azimuths and offsets. This results in the capability to precisely locat the seismic event epicenter, as described by S. M. Mousavi et al. in "Seismic features and automatic discrimination of deep and shallow inducedmicroearthquakes using neural network and logistic regression," Geophysics Journal International, vol. 207, pp. 29-46, 2016. The main concern for the surface seismic data is their low SNR, and hence, the challenge in studying microseismic events is to detect seismic events and suppress the unwanted noise signals.

In general, several detection/denoising methods have been proposed in the literature. Seismic interferometry is one technique that is used to enhance the SNR of passive seismic data. In particular, it includes methods such as cross-correlation, stacking and convolution, as described by A. AlShuhail et al. in "Application of super-virtual seismic refraction interferometry to enhance first arrivals: A case study from Saudi Arabia," The leading Edge, vol. 31, pp. 34-39, 2012, by I. Mallinson et al. in "Enhanced refractor imaging by supervirtual interferometry," The Leading Edge, no. 3, pp. 546-550, 2011, and by P. Bharadwaj et al. "With supervirtual refraction interferometry and free-surface multiples," Geophysics Journal International, vol. 192, pp. 1070-1084, 2013. Another method is to utilize time-frequency analysis to detect/denoise the signal, as described by S. M. Mousavi and C. A. Langston in "Hybrid seismic denoising using higher-order statistics and improved wavelet block thresholding," Bulletin of the Seismological Socelty of America, vol. 106, no. 4, pp. 1380-1393, 2016, and by S. M. Mousavi et al. in "Automatic microseismic denoising and onset detection using the synchrosqueezed continuous wavelet transform," Geophysics, vol. 81, no. 4, pp. 341-355, 2016. This method is based on encoding the noisy signal as an instantaneous frequency of a frequency modulated analytic signal. The peak of the time-frequency signal is estimated and then the denoised signal can be reconstructed. However, this method is prone to noise interferences that may affect the energy concentrated in the time-frequency domain. To improve the denoising results in the time-frequency based method, a reassignment strategy is added along with preand post-processing steps, as described by S. M. Mousavi and C. A. Langston in "Automatic noise-removal/signal-removal based on general cross-validation thresholding in synchrosqueezed domain and its application on earthquake data," Geophysics, vol. 82, no. 4, pp. 211-227, 2017. Another method often used is based on the wavelet transform which converts the noisy signal into the time-frequency domain and decomposes it into different components using an appropriate wavelet. The performance of this method depends on the threshold chosen, the mother wavelet and the number of decomposition levels. A data-driven approach, known as empirical mode decomposition, extracts the basis function from the noisy signal, as described by J. Han and M. V. D. Baan in "Microseismic and seismic denoising via ensemble empirical mode decomposition and adaptive thresholding," Geophysics, vol. 80, no. 6, pp. 69-80, 2015. Nevertheless, the derived basis function may be inaccurate in case of low SNR. Other denoising methods which use manual thresholding in time-frequency domain are the Radon transform, reduced-rank filtering, and damped multi-channel singular spectrum analysis, as described by J. I. Sabbione et al. in "Microseismic data denoising via an apex-shifted hyperbolic Radon transform," in SEG Technical Program Expanded Abstracts 2013, pp. 2155-2161, 2013, by J. I. Sabbione et al. in "Radon transform-based microseismic event detection and signal-to-noise ratio enhancement," Journal of Applied Geophysics, vol. 113, pp. 51-63, 2015, by J. I. Sabbione and D. R. Velis in "A robust method for microseismic event detection based on automatic phase pickers," Journal of Applied Geophysics, vol. 99, pp. 42-50, 2013, by N. Iqbal et al. in "Automated SVD filtering of time-frequency distribution for enhancing the SNR of microseismic/microquake events," Journal of Geophysics and Engineering, vol. 13, pp. 964-973, 2016, and by W. Huang et al. in "Damped multichannel singular spectrum analysis for 3D random noise," in SEG Technical Program Expanded Abstracts 2015, pp. 4714-4719, 2015.

Another approach is the use of Wiener filter based denoising, which has been widely used, as described by K. Peacock and S. Treitel in "Predictive deconvolution: theory and practice," Geophysics, vol. 34, no. 2, pp. 155-169, 1969, and by J. B. U. Haldorsen et al. in "Multichannel Wiener deconvolution of vertical seismic profiles Multichannel Wiener deconvolution of vertical seismic profiles," Geophysics, vol. 59, no. 10, pp. 1500-1511, 1994. This approach requires a priori knowledge of the signal/noise statistics, which is normally not available in practice. Therefore, to solve this issue, the wavelet transform method is used to differentiate the signal from the noise initially, and then the Wiener filter is applied after acquiring the signal statistics, as described by R. Kimiaefar et al. "Seismic random noise attenuation using artificial neural network and wavelet packet analysis," Arabian Journal of Geosciences, vol. 234, no. 9, pp. 1-11, 2016. High and low frequency components are extracted in this method, where the high frequency components are assumed to be noise. A proper threshold and a basis function are still required in this case, which can greatly affect the results. Several efforts have focused on using the Wiener filter without a priori knowing the signal/noise statistics. For example, the noise statistics is calculated using the silence intervals in speech, as described by J. Chen et al. in "New insights into the noise reduction Wiener filter," IEEE Transactions on Audio Speech and Language Processing, vol. 14, no. 4, pp. 1218-1234, 2006. Others tried to locate the noise in the data before an earthquake or a controlled source, as described by J. Wang et al. in "Application of multi-channel Wiener filters to the suppression of ambient seismic noise in passive seismic arrays," The Leading Edge, vol. 27, no. 2, pp. 232-238, 2008, by J. Wang et al. in "Application of frequency-dependent multi-channel Wiener filters to event detection in 2D three-component seismometer arrays," Geophysics, vol. 74, no. 6, pp. 133-141, 2009, by M. Coughlin et al. in "Wiener filtering with a seismic underground array at the Sanford Underground Research Facility," Classical and Quantum Gravity, vol. 31, no. 21, 2014, and by E. Baziw and I. Weir-Jones, "Application of kalman filtering techniques for microseismic event detection," Pure and Applied Geophysics, vol. 159, no. 1, pp. 449-471, 2002.

Despite these efforts, it is extremely difficult to locate the noise-only (or signal-only) part in passive seismic events because of low SNR. Therefore, the main challenge is to realistically estimate the seismic noise. An infinite impulse response (IIR) Wiener filter based denoising method together with time-frequency analysis is used to extract statistical information from the noisy seismic data, as described by N. Iqbal et al. in "Observation-driven method based on IIR Wiener filter for microseismic data denoising," Pure and Applied Geophysics, vol. 175, pp. 2057-2075, 2018. Since the side information about seismic events and the noise helps other denoising methods to perform better, here an automatic event detection method is proposed for this purpose using a deep neural network. The autonomous detection method together with the IIR Wiener filter is used to denoise the passive seismic data.

Several works in the literature described the use of applied deep learning techniques in the seismic detection realm. Deep learning techniques are used for the seismic phase association task to link the phase detected at various sensors from the common earthquake. In particular, a recurrent neural network (RNN) and a convolutional neural network (CNN) can be applied, as described by Z. E. Ross et al. in "PhaseLink: a deep learning approach to seismic phase association," J. Geophys. Res.-Solid Earth, vol. 124, no. 1, pp. 856-869, 2019, and by I. W. Mcbrearty et al. in "Pairwise association of seismic arrivals with convolutional neural networks," Seismological Research Letters, vol. 90, no. 2A, pp. 503-509, 2019. Furthermore, a CNN is used to estimate P-wave arrival times and first-motion polarities in order to localize earthquakes hypocenters, as described by Z. E. Ross et al. in "P wave arrival picking and first-motion polarity determination with deep learning.pdf," J. Geophys. Res.-Solid Earth, vol. 123, no. 6, pp. 5120-5129, 2018. Logistic regression and simple neural network method using several seismic features are used to discriminate deep seismic events from shallow ones, as described by S. M. Mousavi et al. in "Seismic features and automatic discrimination of deep and shallow induced microearthquakes using neural network and logistic regression," Geophys. J. Int., vol. 207, no. 1, pp. 29-46, 2016. Moreover, a support vector machine (SVM) can be used to detect microseismic events based on several time-and spectral-domain features, as descired by S. Qu and Y. Chen in "Automatic microseismic-event detection via supervised machine learning," SEG Internatinal Exposition and 88$^{th}$ Annual Meeting, 2018. A deep CNN can use atrous convolutions to detect seismic events in onedimensional waveforms (traces), as described by Y. Wu et al. in "DeepDetect: a cascaded region-based densely connected network for seismic event detection," IEEE Transactions on Geoscience and Remote Sensing, vol. 57, no. 1, pp. 62-75, 2019. A deep neural network composed of convolutional and long-short-term memory layers can achieve the same goal, as described by S. M. Mousavi et al. in "CRED: a deep residual network of convolutional and recurrent units for earthquake signal detection," Scientific Reports, no. 9, 2019. Both works have considered a single seismic trace to detect and localize the seismic event. These deep learning methods are computationally expensive to use with large seismic data sets, as they have to be applied over the whole data set in a trace-by-trace manner.

Accordingly, it is one object of the present disclosure to provide a method and system for detecting and de-noisying events in the passive seismic data, so that the high accuracy and real-time event detection capability can be achieved in large data sets.

SUMMARY

In an exemplary embodiment, a method for event detection of passive seismic data is disclosed. In the method, features are extracted from the passive seismic data based on a backbone subnetwork of a residual deep neural network. Bounding box proposals are generated for a region of interest (ROI) in the passive seismic data based on the extracted features being input to a region proposal network of the residual deep neural network. The bounding box proposals are classified into two groups. Each bounding box proposal in a first group indicates that a corresponding seismic signal presents in the ROI. Each bounding box proposal in a second group indicates that no seismic signal presents in the ROI. At least one seismic signal is determined in the ROI from the first group of bounding box proposals.

In another exemplary embodiment, an apparatus for event detection of passive seismic data is disclosed. The apparatus includes processing circuitry extracts features from the passive seismic data based on a backbone subnetwork of a residual deep neural network. The processing circuitry generates bounding box proposals for a region of interest (ROI) in the passive seismic data based on the extracted features being input to a region proposal network of the residual deep neural network. The processing circuitry classifies the bounding box proposals into two groups. Each bounding box proposal in a first group indicates that a corresponding seismic signal presents in the ROI. Each bounding box proposal in a second group indicates that no seismic signal presents in the ROI. The processing circuitry determines at least one seismic signal in the ROI from the first group of bounding box proposals.

In another exemplary embodiment, a non-transitory computer-readable medium storing instructions, which when executed by a processor for event detection of passive seismic data, cause the processor to perform extracting features from the passive seismic data based on a backbone subnetwork of a residual deep neural network, generating bounding box proposals for a region of interest (ROI) in the passive seismic data based on the extracted features being input to a region proposal network of the residual deep neural network, classifying the bounding box proposals into two groups, each bounding box proposal in a first group indicating that a corresponding seismic signal presents in the ROI, each bounding box proposal in a second group indicating that no seismic signal presents in the ROI, and determining at least one seismic signal in the ROI from the first group of bounding box proposals.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
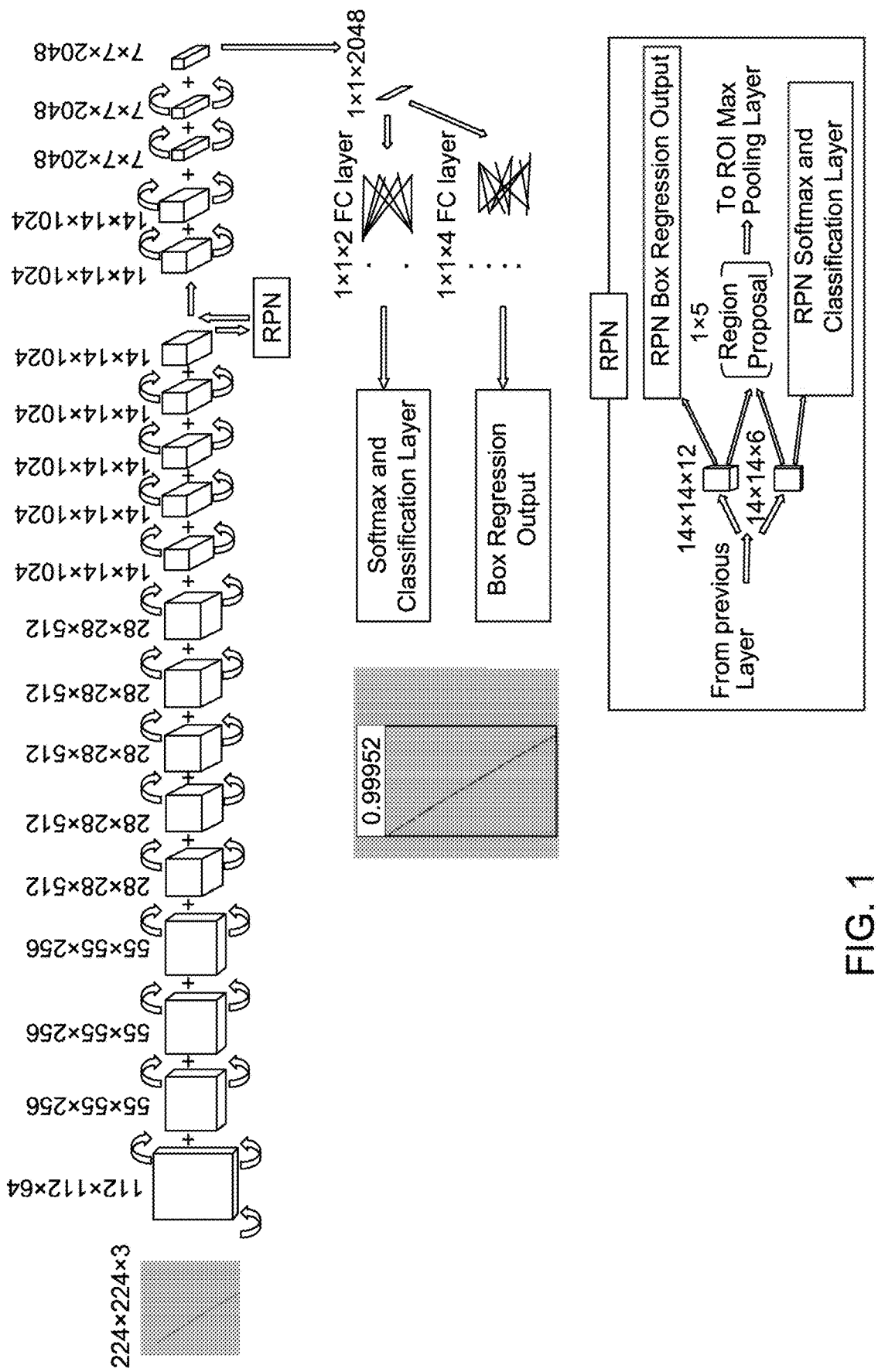
FIG. 1 shows an exemplary residual network according to certain embodiments of the disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

The present disclosure provides methods of detecting and denoising seismic signals by using a residual deep neural network. In one method, event detection can be applied collectively to multiple seismic traces in order to indicate presence of events in a whole seismic data set using a bounding box. This saves computational resources, manual efforts, and time when other detection and/or denoising methods are applied on a portion of the whole seismic data set where events are indicated. The method works by identifying the presence of events in the whole seismic data set, rather than exactly finding the-often noisy-exact event's start and end or P/S (primary wave and seconary wave) arrivals. Moreover, the residual deep neural network provided in this disclosure does not need to be pre-customized to match the signal or noise characteristics. Another advantage of the detection method provided in this disclosure is that it separates noise-only part with the event-part of the data, and hence has the potential to be used for other applications like interferometry.

In some embodiments, the detection method provided in this disclosure can be a preprocessing step that helps other related methods to de-noise or to find the P/S arrivals more accurately with less effort and time (e.g., less processing resources and/or time). This can be done by concentrating on the identified parts (events presence) of the whole seismic data set.

In this disclosure, a fully-automated method for passive seismic event detection can be validated using synthetic and/or real data sets. In an embodiment, only the synthetic data set is used for training the deep neural network. This makes the detection method suitable for large data sets and real-time detection. To ascertain performance, the trained network is first tested on the noisy synthetic data and then on various field data sets to detect noisy seismic events. The detection method can be coupled with an infinite impulse response (IIR) Wiener filter, so that the events can be detected in the seismic data and then be de-noised iteratively. The detection method can be tested on a field data set. The results show better performance in comparison with other methods in related arts.

The performances of some well-known events detection methods, such as STA/LTA (short term average over long term average), Akaike information criterion (AIC), wavelet decomposition, and cross correlation methods, depend heavily on parameter selections. However, the detection method provided in this disclosure is not parameter (e.g., threshold) dependent.

In the detection method, a residual neural network is used for the seismic event detection. For the image classification and object detection, deep neural networks are capable of combining multi-level features in an end-to-end fashion. A depth of the deep neural network has a primary factor on its performance. However, forming a network with more layers stacked on top of each other may generate a persistent problem of vanishing/exploding gradients. Driven by inability to achieve convergence from the beginning, a few techniques were proposed in the related arts to tackle the vanishing/exploding gradients problem, for example, normalized initialization and intermediate normalization layers. However, the problem with these approaches is that the accuracy starts to saturate and then degrades quickly when the network increases in depth. This issue can be solved by using residual networks. The residual networks are easier to be optimized compared to "plain nets" where layers are simply stacked together. The residual networks employ skip connections which act as identity mappings from earlier to later layers.

FIG. 1 shows an exemplary residual network according to certain embodiments of the disclosure. The residual network includes an input layer, a backbone subnetwork, a region proposal network (RPN), and a output detection subnetwork. Various layer activations are shown in FIG. 1. The skip connections simply copy outputs from previous layers to following layers.

In the residual deep neural network, the backbone subnetwork first extracts the relevant features from the input data (e.g., 2D seismic data or set of traces), where these features are progressively learned by applying forward and backward propagation steps to adjust parameters of the backbone subnetwork. This is repeated for all the training input data and the learned features are fed to the RPN to generate bounding box proposals for a region of interest (ROI) in the data.

In an embodiment, the RPN can use anchor boxes to localize the object (or event) to be detected in the data by capturing the scale and aspect ratio of the object. Then, the residual network can utilize a classification branch to make sure an event is present in the ROI. Based on the classification branch, the network can use a bounding box regression with a smooth-L1 loss to estimate a best proposal guess and eliminate the others using a non-max suppression (NMS) algorithm.

Figure 2:
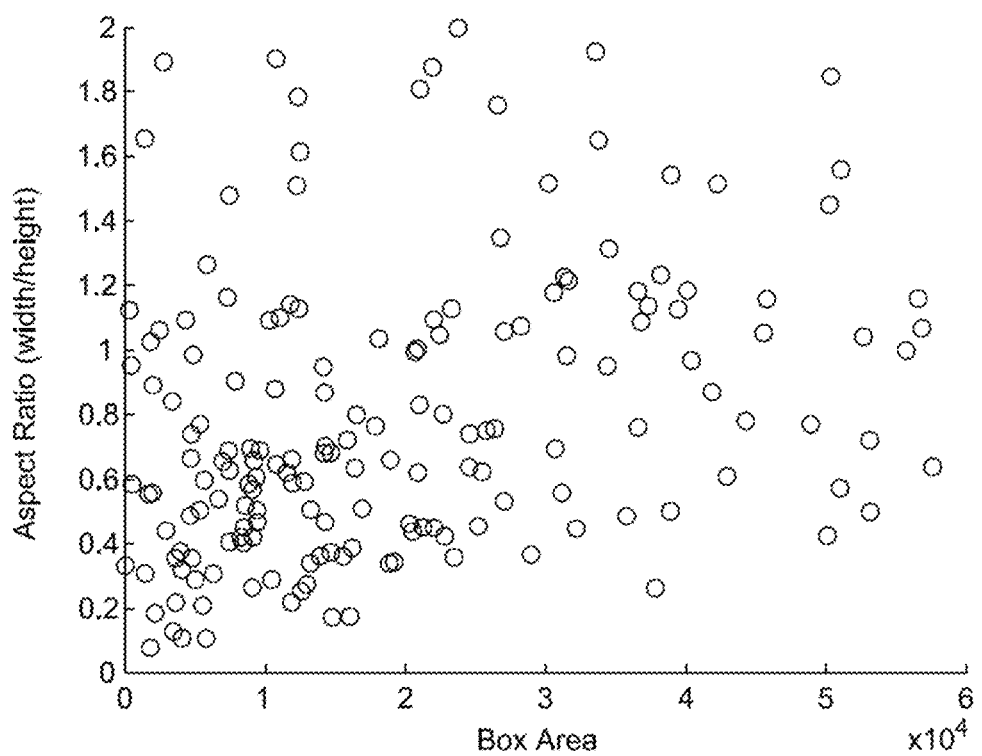
FIG. 2 shows an exemplary range of object sizes (corresponding to event portion sizes in 2D seismic data) that are present in the synthetic training sets according to certain embodiments of the disclosure.

FIG. 2 shows an exemplary range of object sizes (corresponding to event portion sizes in 2D seismic data) that are present in the synthetic training sets according to certain embodiments of the disclosure. It can be shown that a number of object groups are similar in size and shape in FIG. 2.

In an embodiment, a clustering algorithm is used to group similar anchor boxes together. The anchor boxes are chosen based on the object sizes in the training sets. The anchor boxes serve as initial guesses to the bounding boxes which are used to locate the seismic event. To choose the number of the anchor boxes, a clustering algorithm such as K-means clustering algorithm can be used with the intersection over union (IoU) distance metric. The IoU is invariant to the sizes of the anchor boxes, and thus more convenient than the Euclidean distance metric which produces larger errors as the sizes of anchor boxes increase. To estimate the number of anchor boxes to be used, the mean IoU is studied for a range of anchor numbers. A mean IoU over 0.5 ensures that the anchor boxes overlap well with the bounding boxes in the training data. Increasing the number of anchor boxes can improve the IoU performance, but also increases the computation cost, and may lead to data overfitting, causing overall poor detector performance.

In an embodiment, the number of the anchor boxes can be calculated based on the training data and the IoU metric.

Figure 3:
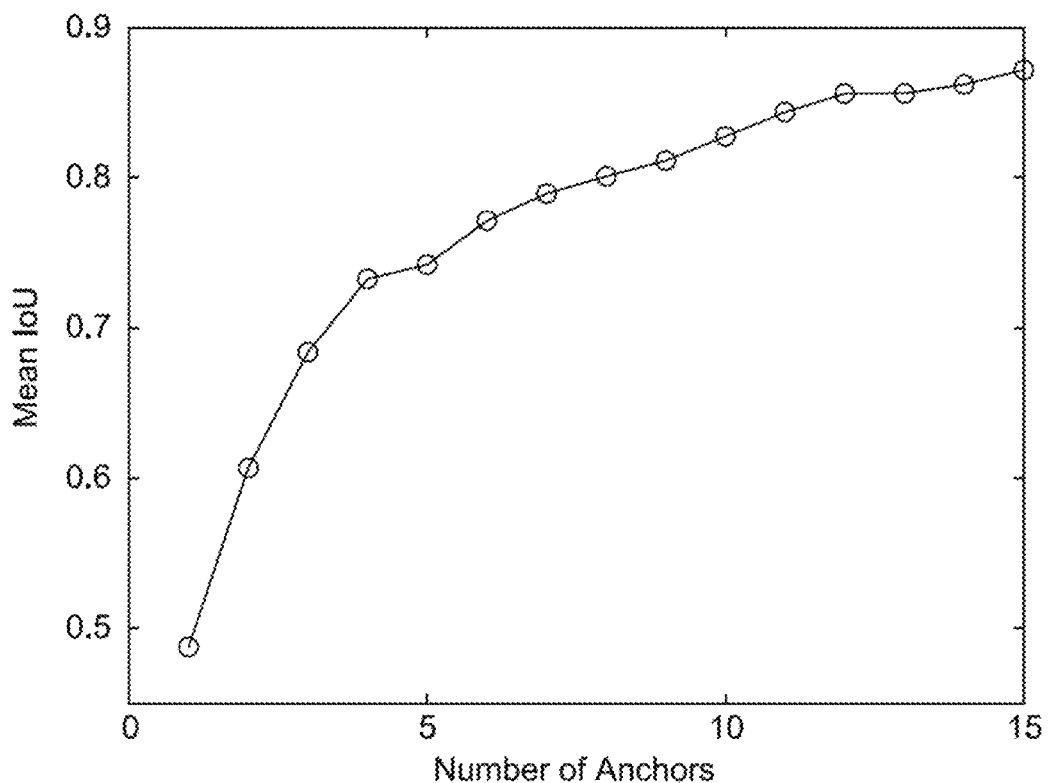
FIG. 3 shows the mean IoU as a function of the number of anchor boxes according to certain embodiments of the disclosure.

FIG. 3 shows the mean IoU as a function of the number of anchor boxes according to certain embodiments of the disclosure. As can be seen, using three anchor boxes can give a mean IoU of 0:68, and choosing more than eight anchor boxes can give only a marginal improvement. Therefore, in an embodiment, five anchor boxes is chosen, which can satisfy the performance requirement in a reasonable time. Based on the extracted features, the candidate proposals can be produced at the RPN. The number of classes to detect is two by default, i.e., the presence or absence of a seismic event.

Figure 4:
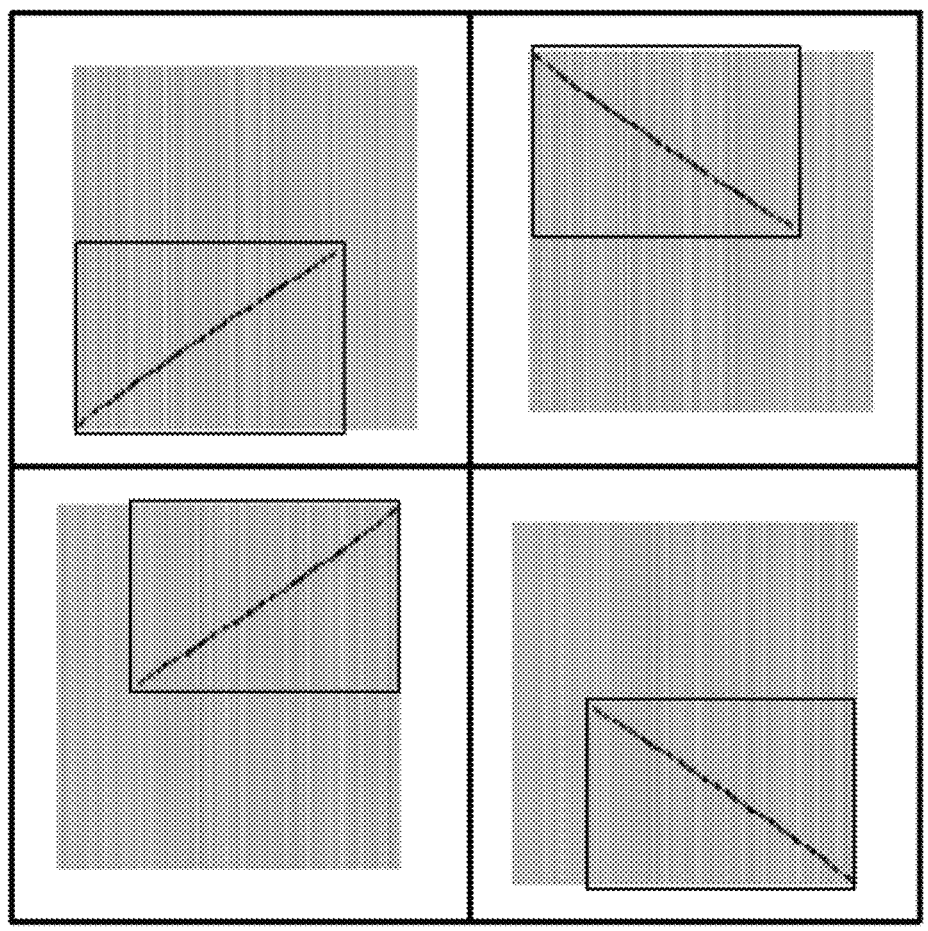
FIG. 4 shows exemplary data argumentations according to certain embodiments of the disclosure.

FIG. 4 shows exemplary data argumentations according to certain embodiments of the disclosure. According to aspects of the disclosure, to improve the performance of the residual neural network, an augmentation can be applied on the training data. For example, the training data sets can be flipped in horizontal and/or vertical directions along with the bounding box around the signal, as shown in FIG. 4. The new data sets can also be used in the training process. The data argumentations can allow the residual neural network to learn additional information about the training data from the existing data sets without requiring additional data. The data argumentations can improve the detector performance to detect the area of interest at various locations inside the data sets.

According to aspects of the disclosure, visualizing the activations of the convolutional layers can give an insight into the inner working of the residual deep neural network. Therefore, a synthetic seismic data set can be used to test how the layers of the residual neural network react to it.

Figure 5:
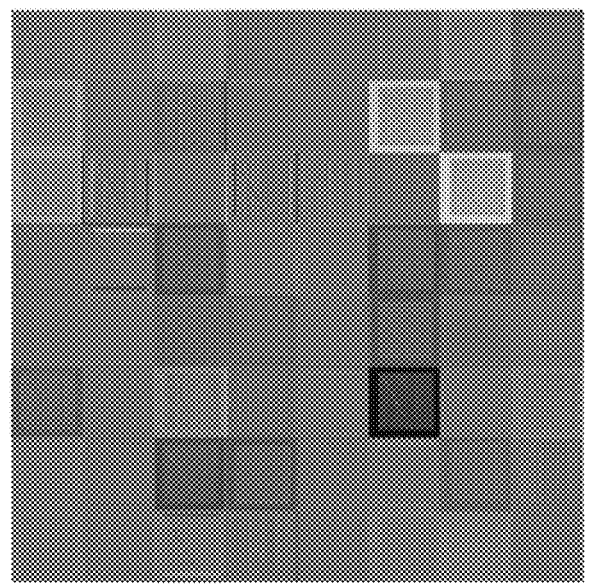
FIG. 5 shows exemplary activations of different channels at the first convolutional layer of the backbone subnetwork according to certain embodiments of the disclosure.

FIG. 5 shows exemplary activations of different channels at the first convolutional layer of the backbone subnetwork according to certain embodiments of the disclosure. In FIG. 5, white pixels imply strong positive activations, dark pixels represent strong negative activations, and grey pixels imply no activations. Therefore, it can be seen that some channels activate more to the input data than others.

Figure 6:
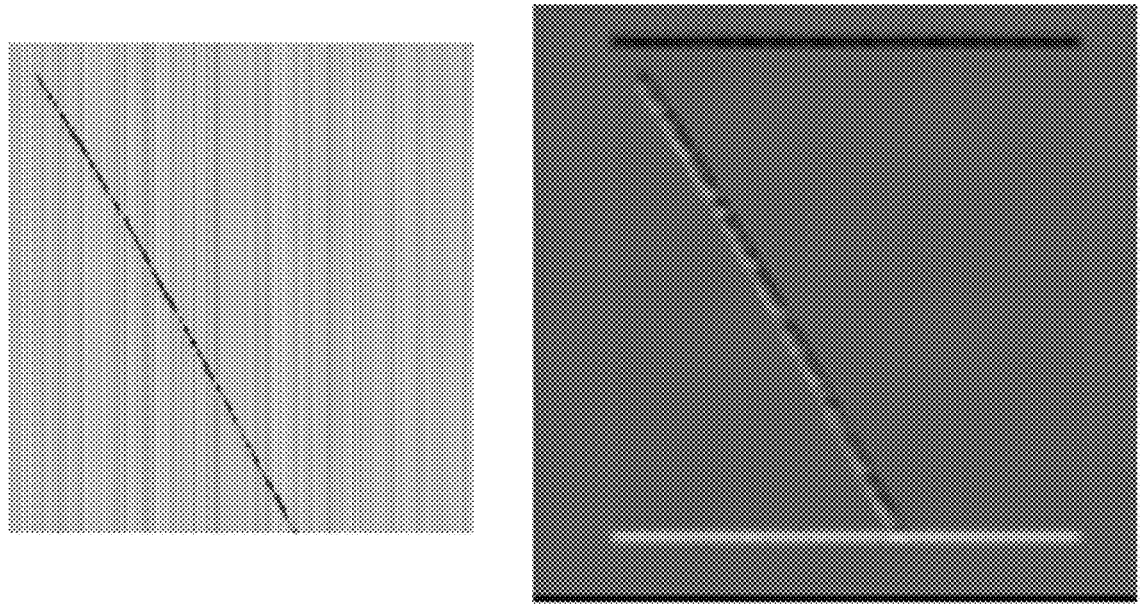
FIG. 6 shows an exemplary channel with a strongest activation according to certain embodiments of the disclosure.

FIG. 6 shows an exemplary channel with a strongest activation according to certain embodiments of the disclosure.

Figure 7:
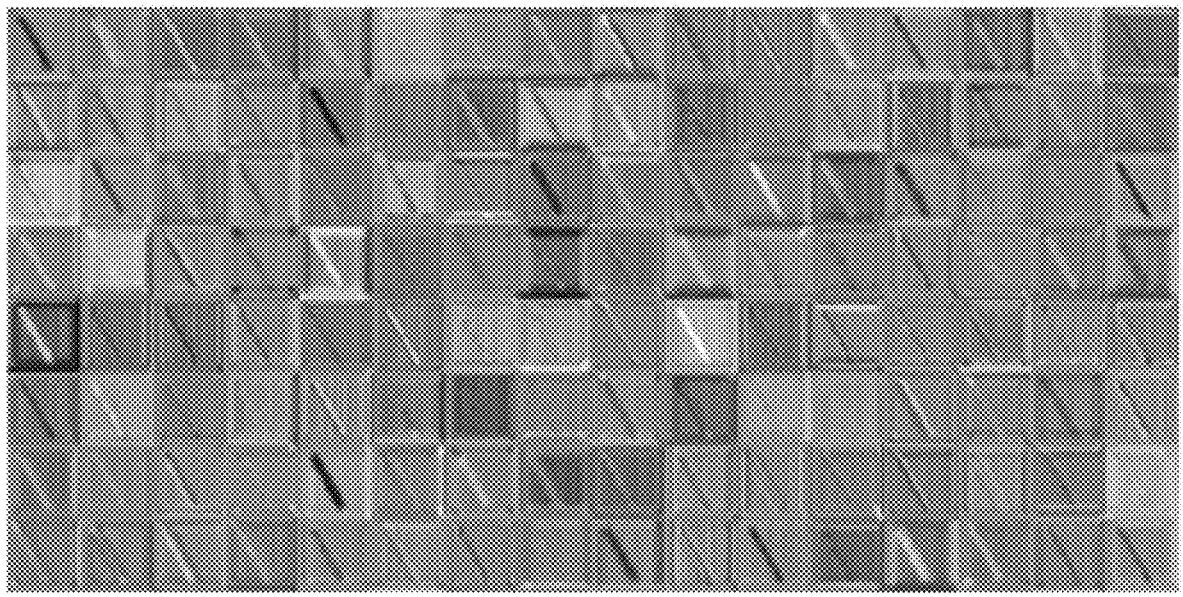
FIG. 7 shows exemplary activations of different channels at the last convolutional layer of the backbone subnetwork according to certain embodiments of the disclosure.

FIG. 7 shows exemplary activations of different channels at the last convolutional layer of the backbone subnetwork according to certain embodiments of the disclosure.

In one embodiment, white and dark pixels in a layer are taken into consideration as positive and negative activations of the layer. In another embodiment, only positive activations are considered because of the ReLU (Rectified Linear Unit).

Figure 8:
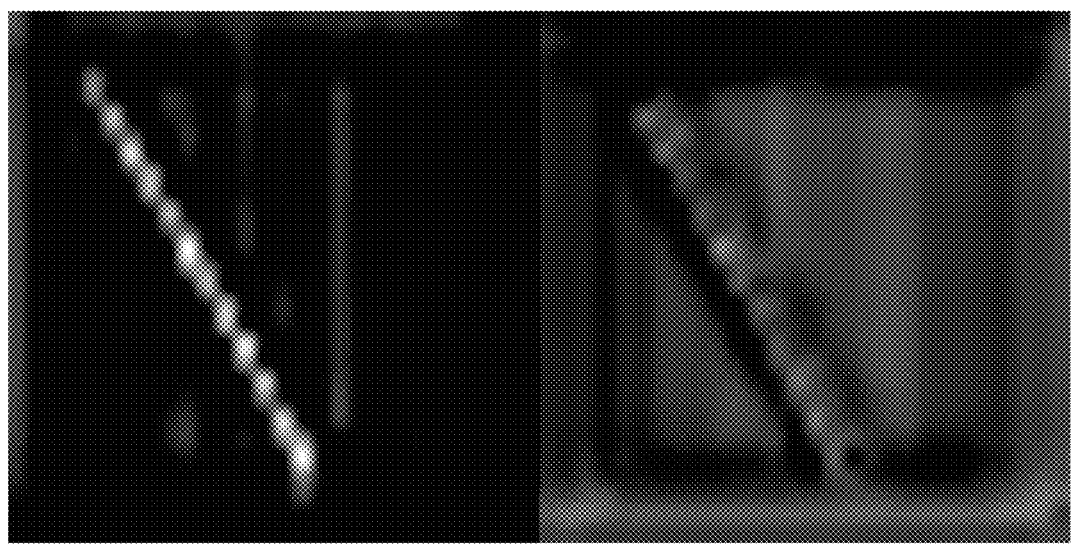
FIG. 8 shows exemplary activations of a last ReLU in the backbone subnetwork according to certain embodiments of the disclosure.

FIG. 8 shows exemplary activations of a last ReLU in the backbone subnetwork according to certain embodiments of the disclosure. In FIG. 8, the white pixels correspond to the seismic traces. This information is not passed to the residual deep neural network explicitly but can be learned as a useful feature. This feature can be used to distinguish between classes of data, and, therefore, is learned by the deeper layers on their own.

According to aspects of the disclosure, synthetic seismic data can be generated with Ricker wavelet and central frequencies can be uniformly chosen from a range 30-100 Hz for example. The number of traces for an input data (or observation) can be set to 200 and the sampling frequency can be chosen to be 500 Hz. Various amplitude events together with different moveouts can be generated and used in the training process to strengthen the detector performance.

In an embodiment, 60% of the data (or observation) can be used for training, while 40% can be used for testing. A total of 300 seismic data observations can be used in the training procedure, where bounding boxes are drawn around areas having seismic events as ground-truth references. Each bounding box can have four numbers to indicate a corresponding area of interest. A position of a left upper corner of a bounding box can be indicated by the first two numbers, x and y coordinates, whereas, a width and a height of the bounding box can be represented by the other two numbers. The generated data is shuffled randomly prior to training to prevent any bias in the generation and labeling process. An input size of the residual neural network can be specified as 224×224×3 for example, where 3 channels are for color input. Up/down-sampling can be performed in order to match the data size with the input size.

Figure 9:
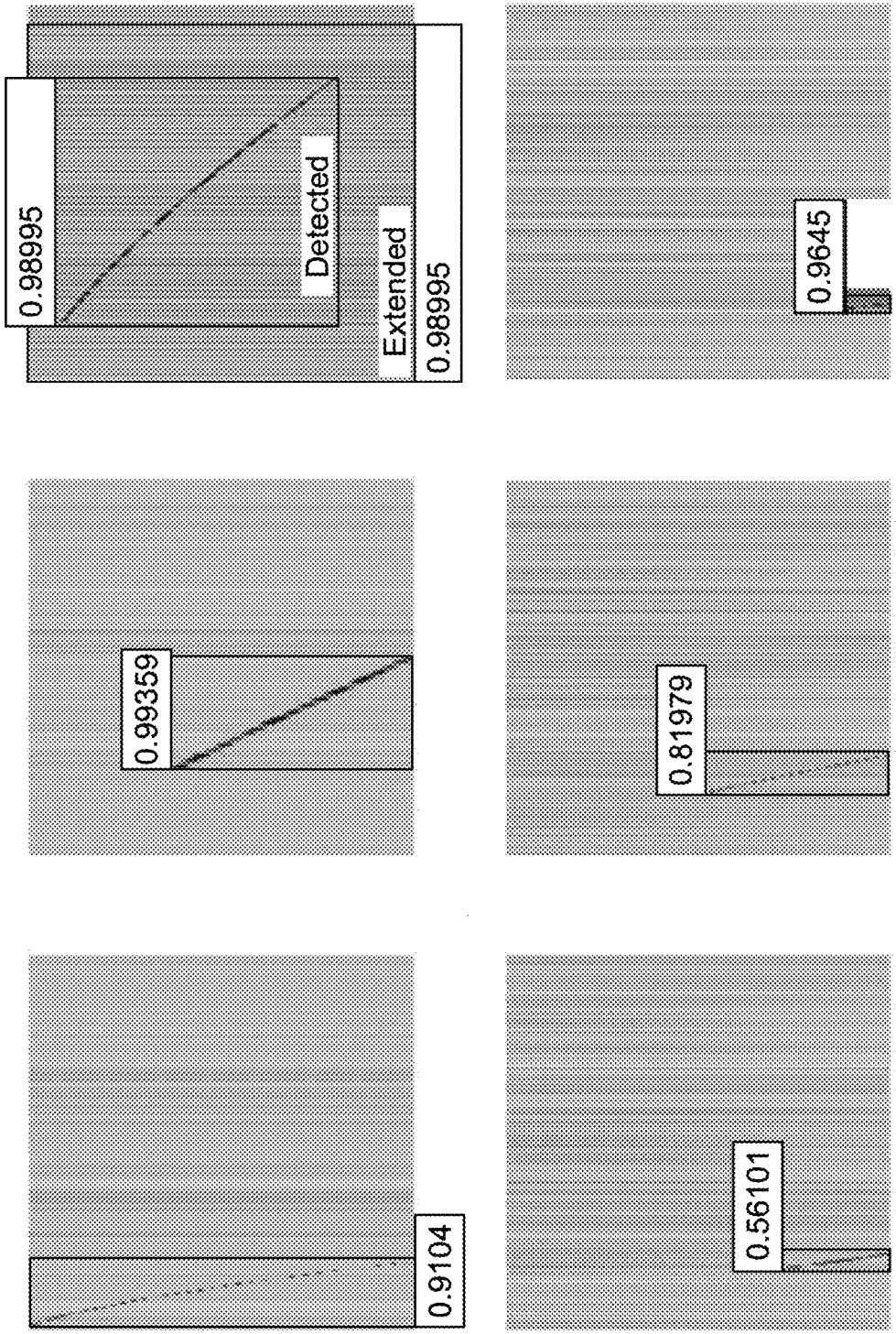
FIG. 9 shows exemplary seismic signals (events) detection with bounding boxes and confidence values according to certain embodiments of the disclosure.

FIG. 9 shows exemplary seismic signals (events) detection with bounding boxes and confidence values according to certain embodiments of the disclosure.

According to aspects of the disclosure, various de-noising methods can be used to de-noise the seismic data. In one method (referred to as the IIR Wiener filter de-noising method), after the events are detected using the residual neural network, an autocorrelation between the noisy observations (or noisy events) and the noise can be estimated. The Laplace transform (e.g., Z-transform) of the autocorrelation sequences can be determined for the noisy observations and the noise. A whitening filter can be obtained, and the roots of the Z-transform of the autocorrelation sequences (corresponding to the noisy observations) that fall inside a unit circle can be computed. A second filter and its causal part can be obtained using the Z-transform of the autocorrelation sequences (corresponding to the noise) and the whitening filter. An IIR filter can be obtained by cascading the whitening filter and the second filter. The noisy observations can be filtered by the IIR filter to obtain the clean signals. The de-noising method can be repeated iteratively to improve the quality of the signal. In an embodiment, the de-noising method is repeated twice as iterating more does not improve the results. Finally, a wavelet de-noising step can also be applied.

Table 1 shows exemplary hyper-parameters of the residual neural network according to certain embodiments of the disclosure.

TABLE 1

| Hyper-parameter | Set value |
| --- | --- |
| Optimizer | SGDM |
| Mini-batch size | 32 |
| Initial learning rate | $1 \times 10^{-3}$ |
| Momentum | 0.9 |
| L2Regularization | $1 \times 10^{-4}$ |

In Table 1, the optimizer is stochastic gradient descent with momentum (SGDM). Momentum is used as it can provide faster convergence compared to some other optimizers. L2 regularization is used to introduce an amount of generality and prevent overfitting of the training data. A small mini-batch size can improve the convergence speed, and hence the batch size of 32 is used. The results of the detector on the synthetic test data can be referenced to FIG. 9, where a bounding box is drawn around the detected event and a prediction value is shown to reflect the confidence of the detector. To further validate the performance of the detector, it is also tested on the noisy synthetic data, where random noise is added.

Figure 10:
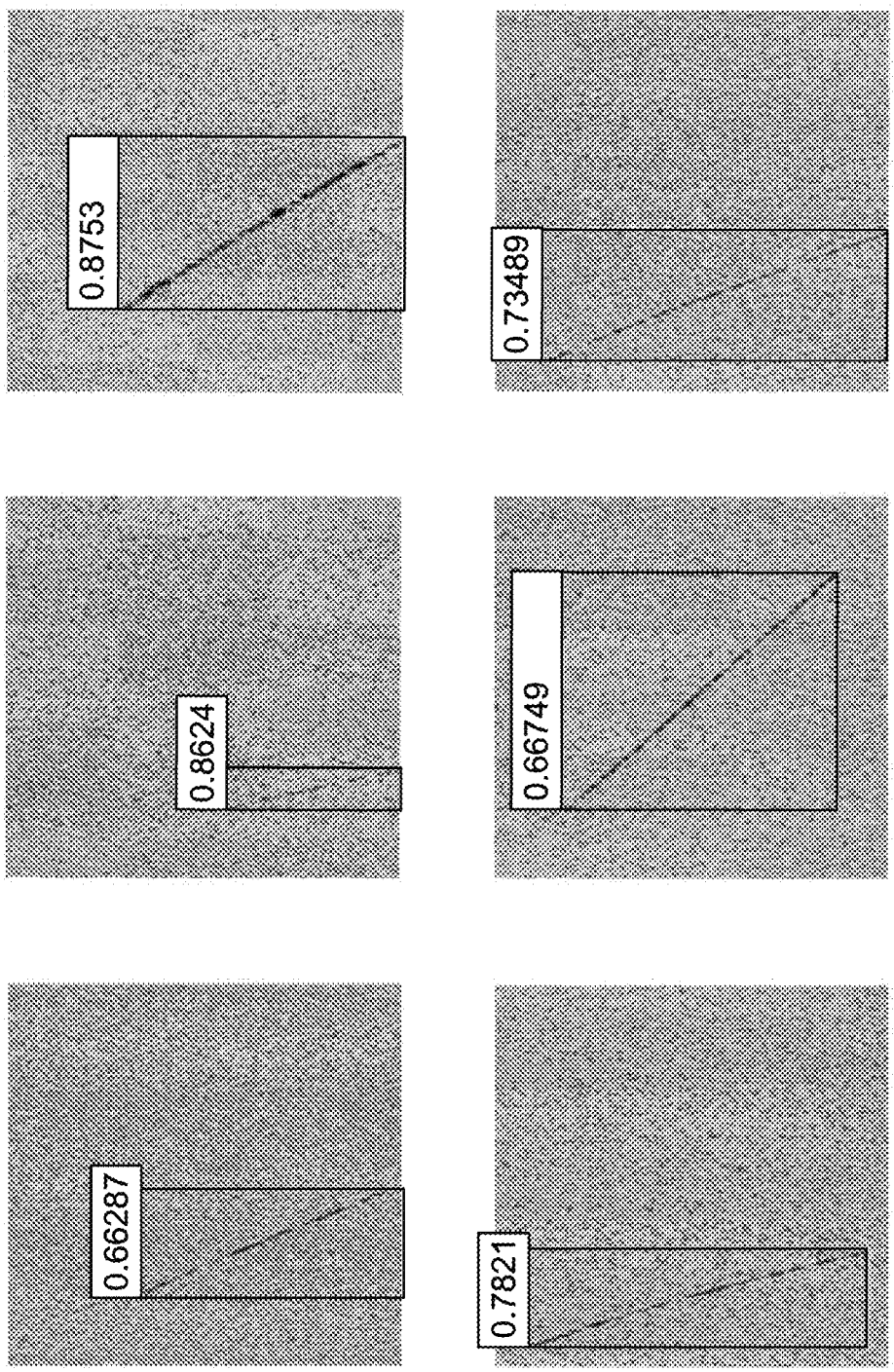
FIG. 10 shows exemplary noisy seismic signal detection with bounding boxes according to certain embodiments of the disclosure.

FIG. 10 shows exemplary noisy seismic signal detection with bounding boxes according to certain embodiments of the disclosure. It is shown that the detector which is trained on noiseless synthetic seismic data can detect noisy seismic events efficiently. If overfitting presents a challenge, it can be reduced by adding noise to the training data. In an embodiment, events with variable amplitude are used in the training data. Therefore, overfitting is not encountered and the trained model generalizes well to noisy seismic data.

It is assumed that the no event is outside the detected region of the bounding box. However, an event may be buried under noise and not detected by the residual deep neutral network. That is, there is a likelihood that traces near the bounding box can contain an event.

According to aspects of the disclosure, the bounding box can be automatically extended along the event-detected diagonal to capture other traces of the seismic data where event may be present. An aspect ratio of the bounding box can be held constant during the extension of the bounding box to capture the expected pattern of the seismic signal. The extension of the bounding box can be included into the detection method, as shown in the top-right signal of FIG. 9. It can be observed that traces on the edges in the sub-figure of the top-right signal have no visible event, which in a real scenario can happen due to noise. After the extension, the bounding box can contain the traces where the event is predicted. The extension can separate the noise from the noisy event which is needed for the de-noising method. The extension can be applied later on the field data sets for detection and de-noising.

The performance of the detector can be measured on the test data in a number of ways. One way is to study the precision and the recall using overlap between the detected result and the ground-truth data. The precision measures the accuracy of the predictions, while the recall measures the ability to find all instances of an object in the data. In the object detection field, the precision is defined as a ratio of true-positive detections to all detections, while the recall is defined as a ratio of true-positive detections to ground-truth bounding boxes.

Figure 11A:
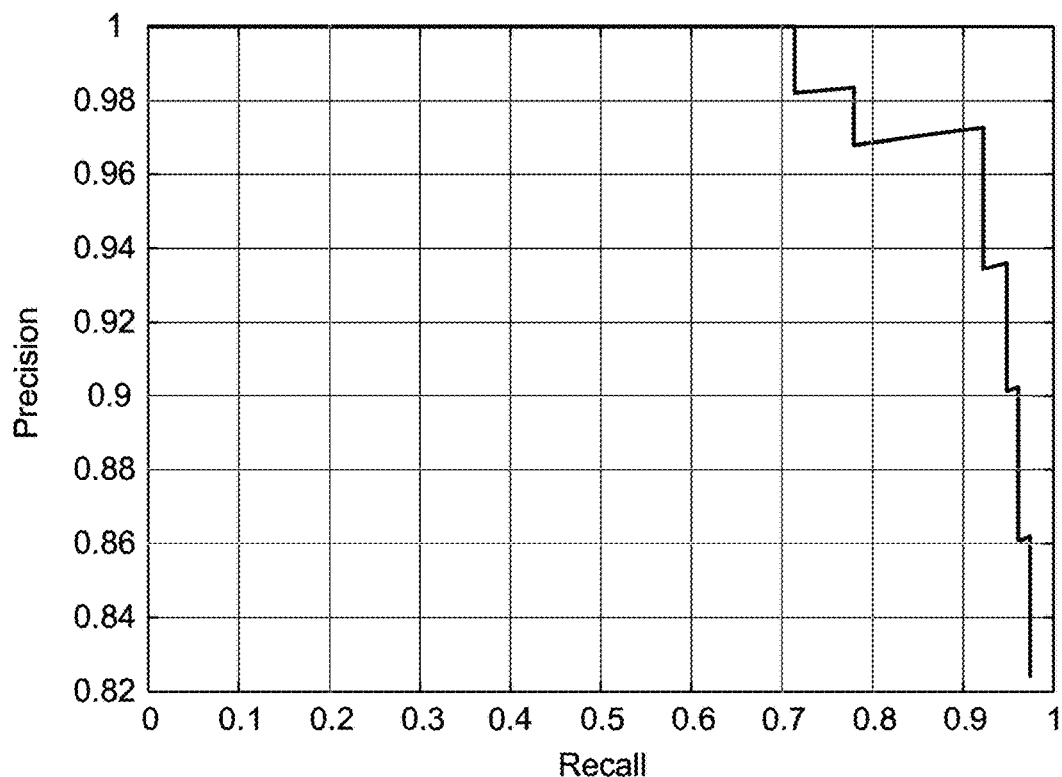
FIG. 11A show an exemplary precision versus recall plot for a detector according to certain embodiments of the disclosure.

FIG. 11A show an exemplary precision versus recall plot for a detector according to certain embodiments of the disclosure. In this plot, an IoU of 0.5 is used as a performance metric. An average precision represents an area under the curve. In FIG. 11A, the average precision is 96%. Furthermore, a miss rate of the detector is defined as a ratio of false positives to all instances.

Figure 11B:
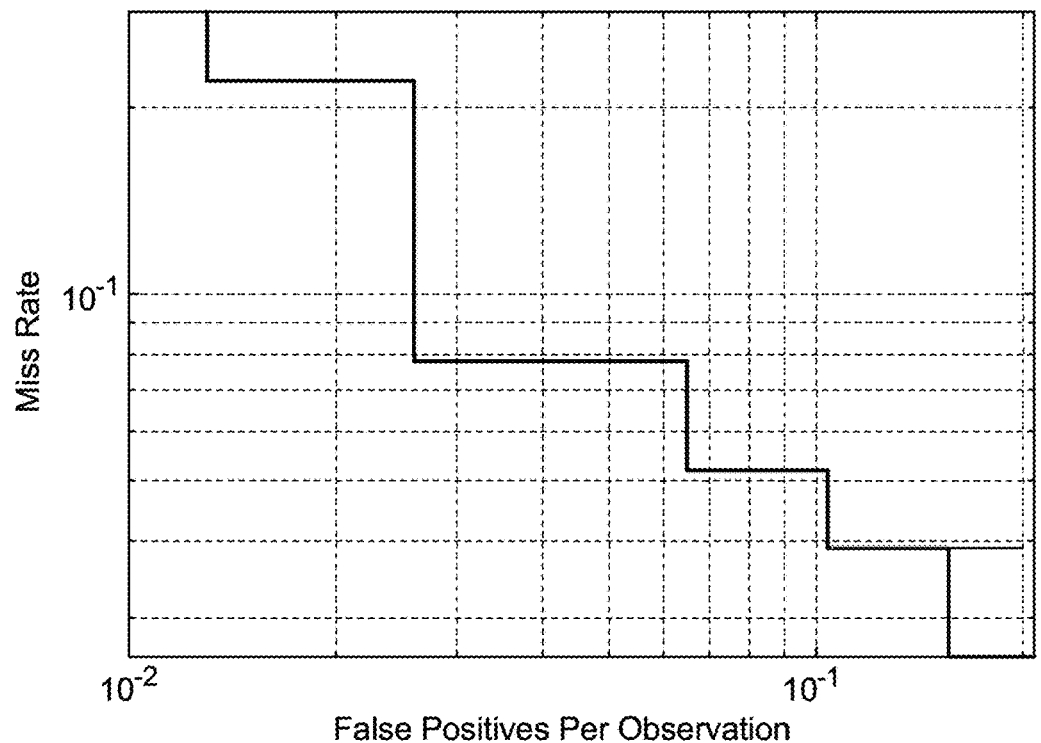
FIG. 11B shows an exemplary miss rate versus false positives per observation according to certain embodiments of the disclosure.

FIG. 11B shows an exemplary miss rate versus false positives per observation according to certain embodiments of the disclosure. In FIG. 11B, the log-average miss rate is calculated in comparison with the ground truth data. The log-average miss rate is around 0.06.

Furthermore, the effect of the number of observations can be considered. The average precision and the average time to train the detector with the synthetic data are used as a comparison metric. Table II shows the precision achieved by the residual deep neural network, and the time it takes to train the network for a given number of observations.

TABLE II

| No. of observations | Training Time (min.) | Precision |
| --- | --- | --- |
| 50 | 68.1 | 0.81 |
| 100 | 96 | 0.87 |
| 150 | 144.8 | 0.91 |
| 200 | 194.4 | 0.96 |
| 250 | 388.2 | 0.97 |
| 300 | 362.2 | 0.98 |

In Table II, training on 300 synthetic observations can provide the best trade-off between precision and computational cost. If skip connections are not used in the residual neural network in FIG. 1, the weights of deep layers may not be trained well. In an embodiment, a computer with 2 CPU (central processing unit) cores and 8 Gigabytes of RAM (random access memory) is used in the simulation. The benefit of the detection method is that the training is done only once. The training process can be made faster by using a GPU (graphic processing unit) based device.

In an embodiment, a global seismic data set, which consists of a large number of noise and signal observations, can be used to test the efficacy of the detection method. It is noted that the detection method takes into account multiple traces at the same time, rather than looking for an event in a single trace.

Figure 12A:
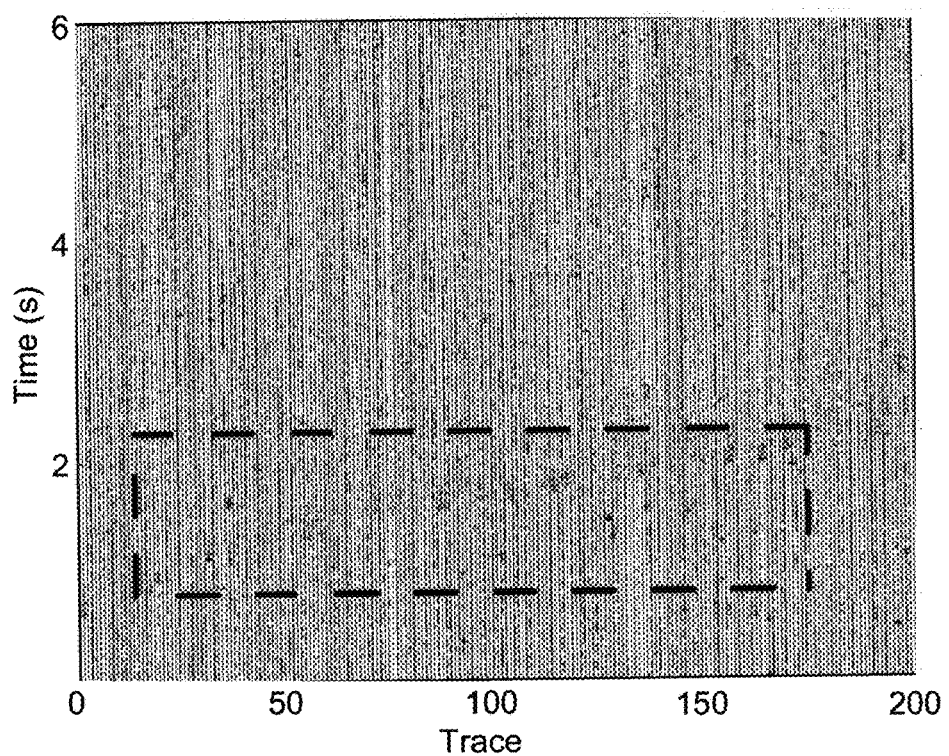
FIG. 12A shows exemplary noisy traces from the global seismic data set according to certain embodiments of the disclosure.

FIG. 12A shows exemplary noisy traces from the global seismic data set according to certain embodiments of the disclosure. In FIG. 12A, 200 traces from the data set are sorted according to S-wave arrivals, and the duration is 60 seconds. The SNR is 0.3 dB in FIG. 12A. The detection method can be applied to detect the event and then to de-noise the detected event using the IIR Weiner filter method.

Figure 12B:
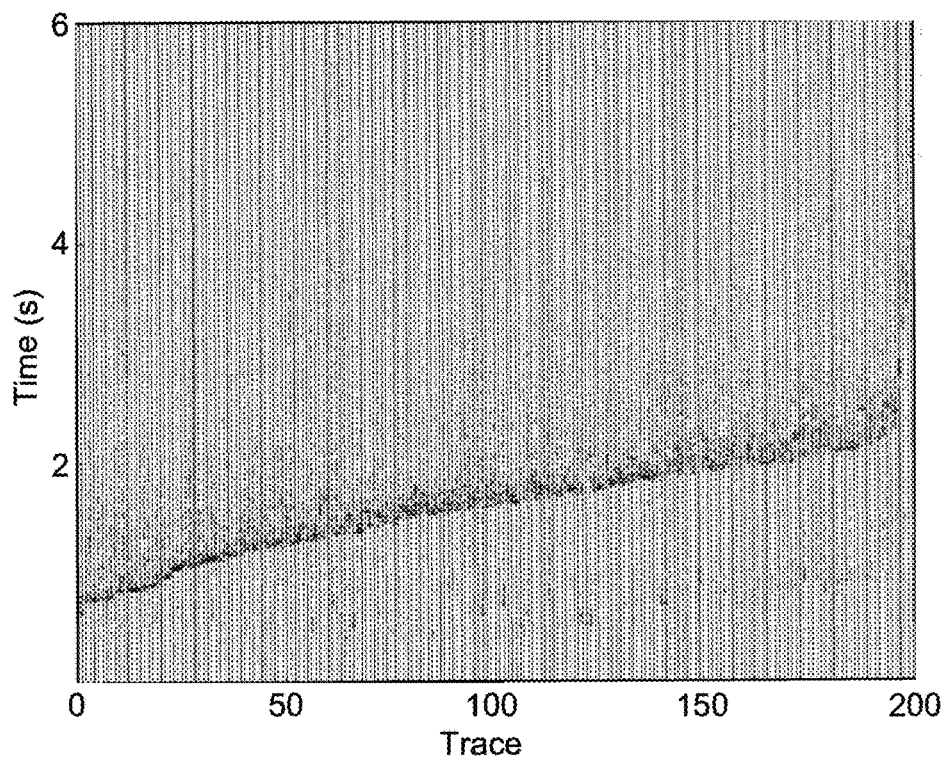
FIG. 12B shows the de-noised results of the noisy traces in FIG. 12A according to certain embodiments of the disclosure.

FIG. 12 B shows the de-noised results of the noisy traces in FIG. 12A according to certain embodiments of the disclosure. The de-noised results show a tremendous improvement in SNR.

In an embodiment, a deep detect (DD) method and a template matching (TM) method are used for comparison. Both methods detect events trace-by-trace. However, the DD method uses deep neural networks, while the TM method uses cross-correlation between a template and a trace for event detection. The DD method is described by Y. Wu et al. in "DeepDetect: a cascaded region-based densely connected network for seismic event detection," IEEE Transactions on Geoscience and Remote Sensing, vol. 57, no. 1, pp. 62-75, 2019. The TM method is described by S. J. Gibbons and F. Ringdal in "The detection of low magnitude seismic events using array-based waveform correlation," Geophys. J. Int., vol. 165, pp. 149-166, 2006.

Figure 13A:
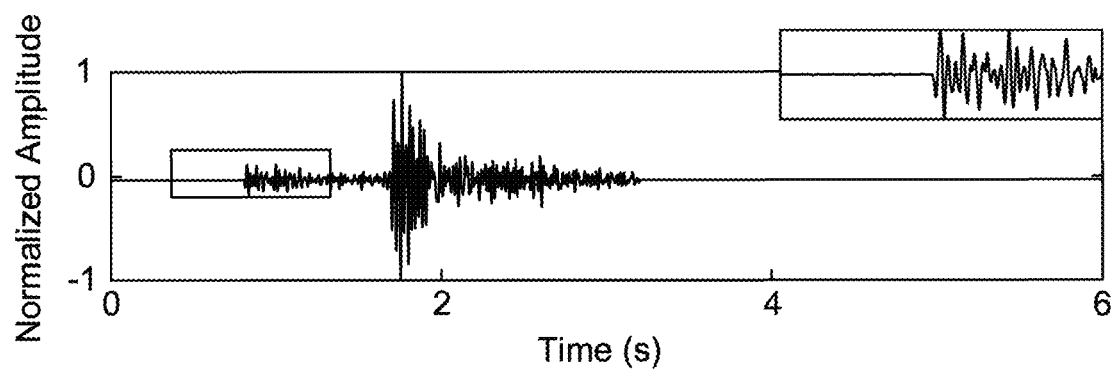
FIGS. 13A-13C show an extracted clean trace, a noisy trace, and a de-noised result of the noisy trace, respectively, according to certain embodiments of the disclosure.
Figure 13B:
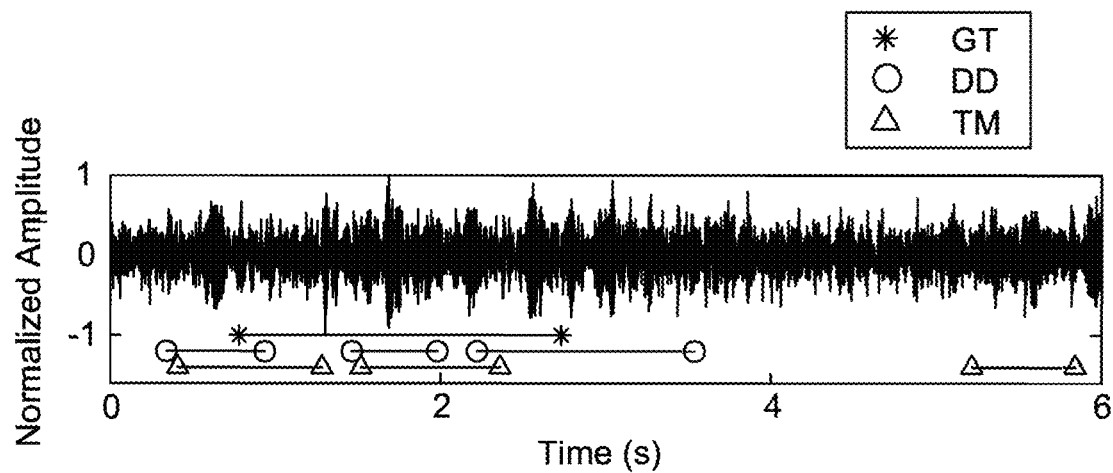
Figure 13C:
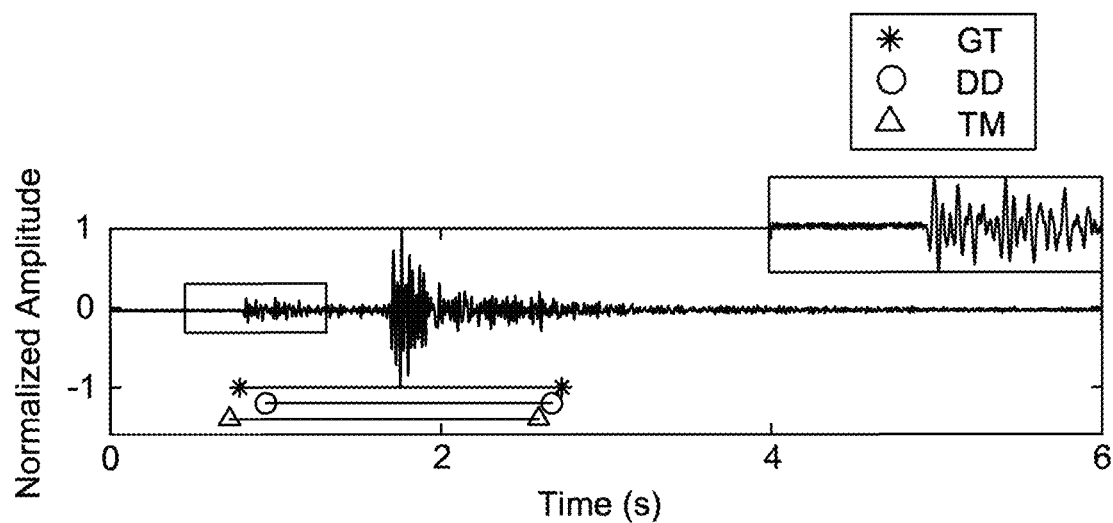

FIGS. 13A-13C show an extracted clean trace, a noisy trace, and a de-noised result of the noisy trace, respectively, according to certain embodiments of the disclosure. The DD and TM methods are applied on the noisy trace in FIG. 13B, and they fail to detect the event correctly. After applying the detection method with the de-noising method to the noisy trace, both DD and TM methods are able to detect the event accurately, as shown in FIG. 13C. It can be concluded that the detection method provided in this disclosure can help other methods to detect the event more precisely. Unlike the TM method, the detection method is not parameter (e.g., threshold) dependent. Moreover, both DD and TM methods look for the event in a trace-by-trace manner, which is very time consuming in the case of gigantic seismic data sets. However, the detection method provided in this disclosure considers multiple traces to collectively identify the event in such a huge amount of data. The detection method works by indicating the event presence, rather than finding exact P/S arrivals. The detection method can help other methods to de-noise and/or detect the seismic signal by concentrating on the event-presence parts of the data. Therefore, other methods like the DD and TM methods can be used afterwards to detect the event or P/S-arrivals more accurately with less time and effort.

It is noted that the common events detection methods such as STA/LTA, AIC, wavelet decomposition, and cross-correlation methods need to adjust the thresholds and/or parameters in order to detect the highly dynamic events. However, one advantage of the detection method is that the network is trained offline using the synthetic data. Once the training is complete, one can apply it to a continuous stream of recording to detect low SNR events automatically and in real-time. This is of great value to automatic mapping of fractures for micro-seismic monitoring operations as the small magnitude events are often buried under noise and are hard to detect.

In this disclosure, a fully-automated and reliable detection method of seismic events is provided. This method employs a residual neural network to detect the seismic events and is compatible with other detection and/or de-noising methods such as IIR Wiener filter based de-noising method. This de-noising method can make use of the second-order statistics that are directly obtained from the data with the help of the residual deep neural network detector. The overall detection and de-noising method is general-purpose, and can be applied to diverse seismic environments. The developed method is trained and successfully tested on synthetic and field data sets. Since the detector only uses synthetic data for training, it is well suited for large data sets and real-time monitoring. Furthermore, the detection method together with the IIR Wiener filter based de-noising method achieves better results in comparison to other de-noising methods.

Figure 14:
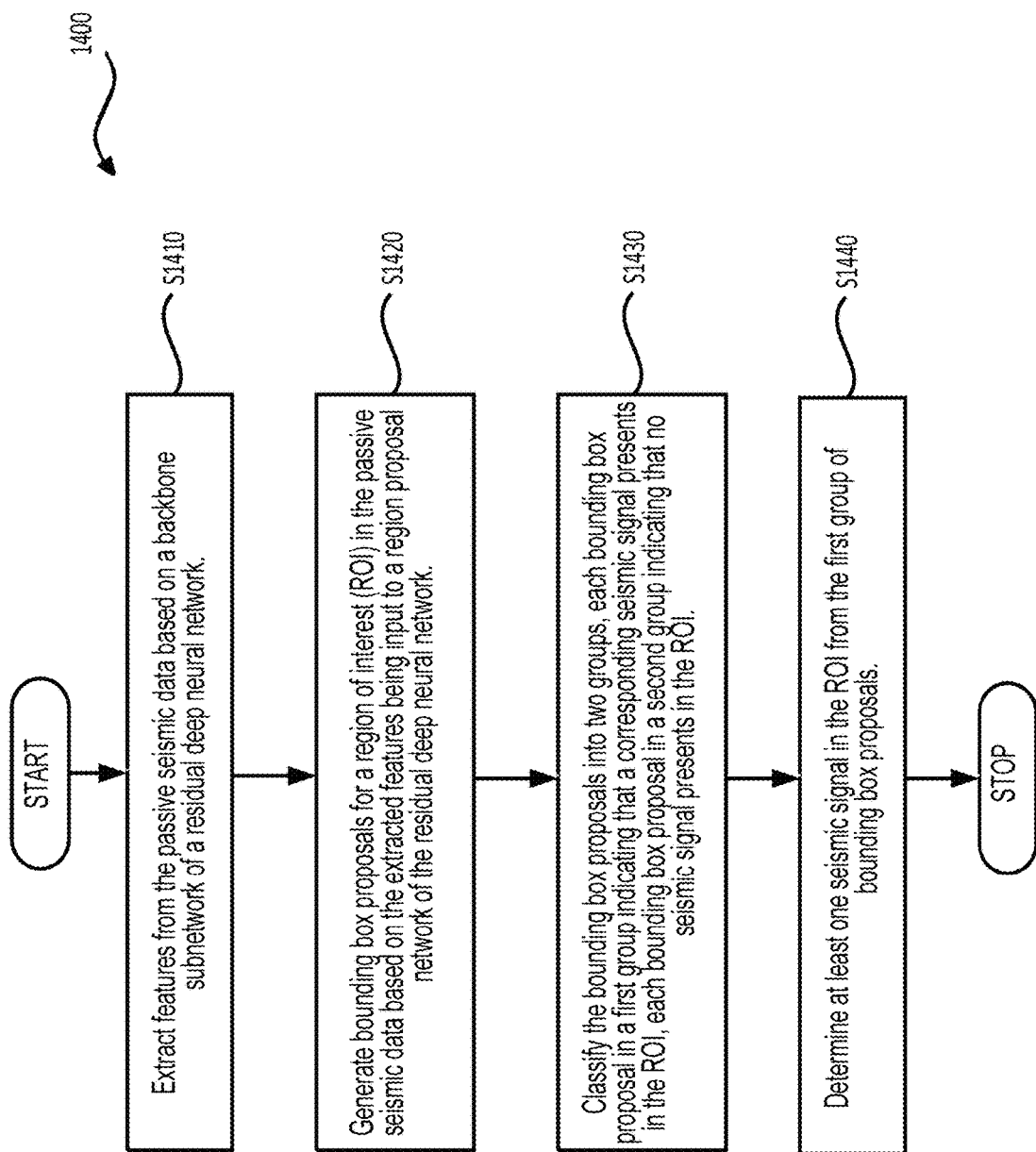
FIG. 14 shows an exemplary flowchart according to certain embodiments of the disclosure.

FIG. 14 shows an exemplary flowchart according to certain embodiments of the disclosure. The flow chart outlines a process (1400). In various embodiments, the process (1400) can be executed by processing circuitry of the computer system (1500) in FIG. 15. In some embodiments, the process (1400) can be implemented in software instructions, thus when the processing circuitry executes the software instructions, the processing circuitry performs the process (1400). The process (1400) starts at S1410, where the process (1400) extracts features from the passive seismic data based on a backbone subnetwork of a residual deep neural network. Then, the process (1400) proceeds to step S1420.

At step S1420, the process (1400) generates bounding box proposals for a region of interest (ROI) in the passive seismic data based on the extracted features being input to a region proposal network of the residual deep neural network. Then, the process (1400) proceeds to step S1430.

At step S1430, the process (1400) classifies the bounding box proposals into two groups. Each bounding box proposal in a first group indicates that a corresponding seismic signal presents in the ROI. Each bounding box proposal in a second group indicates that no seismic signal presents in the ROI. Then, the process (1400) proceeds to step S1440.

At step S1440, the process (1400) determines at least one seismic signal in the ROI from the first group of bounding box proposals. Then, the process (1400) terminates.

In an embodiment, the process (1400) adjusts parameters of the backbone subnetwork based on the extracted features.

In an embodiment, the process (1400) flips each bounding box proposal in the first group in one of a horizontal direction or a vertical direction along with the respective bounding box proposal.

In an embodiment, the process (1400) de-noises the at least one seismic signal based on an infinite impulse response (IIR) Wiener filter based de-noising method.

In an embodiment, the process (1400) increases a size of each bounding box proposal in the first group along a diagonal associated with a seismic signal detected inside the respective bounding box proposal. An aspect ratio of each bounding box proposal is kept as constant during the increasing the size of the respective bounding box proposal.

In an embodiment, the process (1400) generates synthetic seismic data based on a Ricker wavelet, trains the residual deep neural network based on a portion of the synthetic seismic data, and tests the residual deep neural network based on a remaining portion of the synthetic seismic data.

In an embodiment, the process (1400) adds random noise to the remaining portion of the synthetic seismic data to generate noisy synthetic seismic data, and tests the residual deep neural network based on the noisy synthetic seismic data.

The techniques described above, can be implemented as computer software using computer-readable instructions and physically stored in one or more computer-readable media. For example, FIG. 15 shows a computer system (1500) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 15:
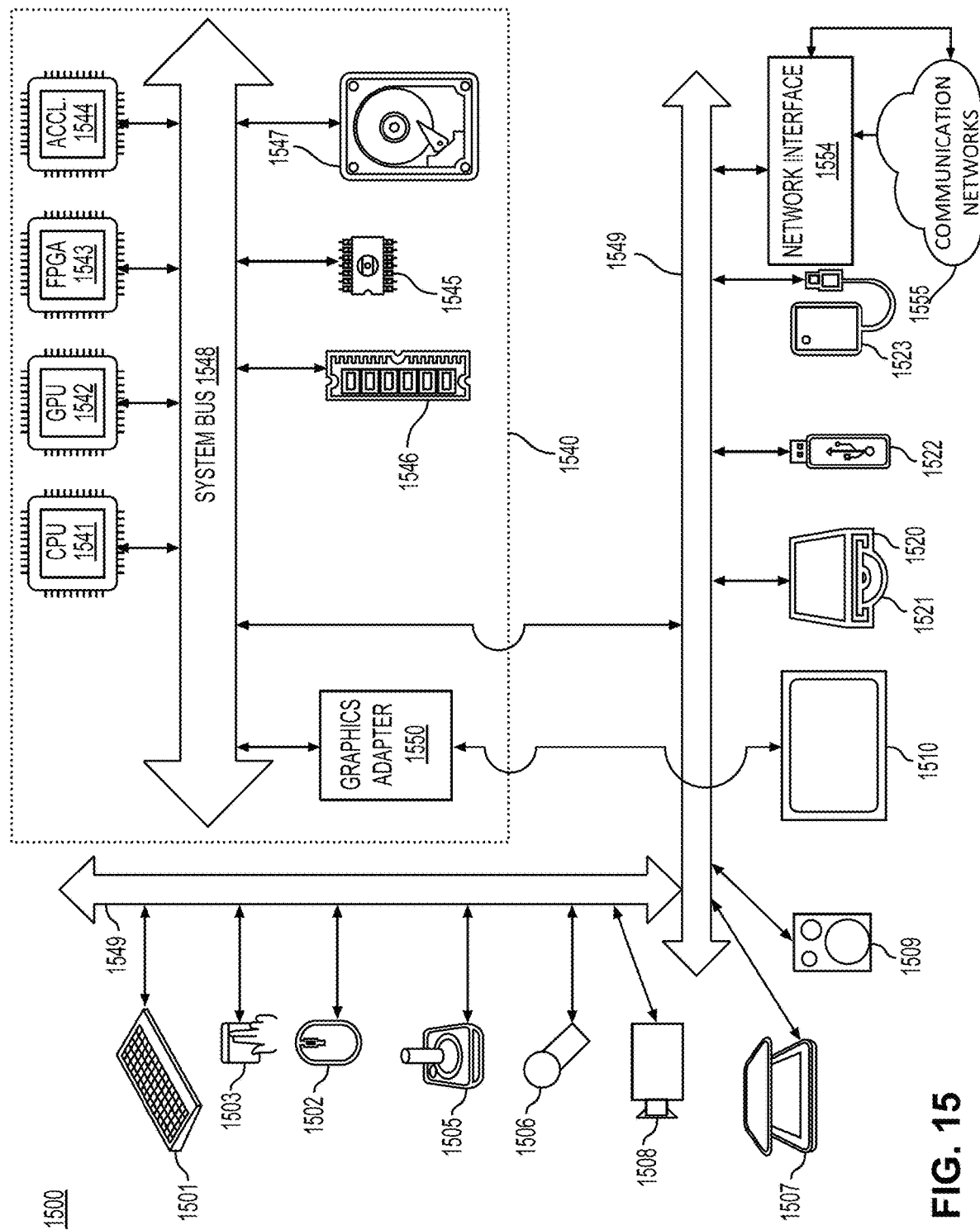
FIG. 15 shows an exemplary computer system according to certain embodiments of the disclosure.

The components shown in FIG. 15 for computer system (1500) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1500).

Computer system (1500) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1501), mouse (1502), trackpad (1503), touch screen (1510), data-glove (not shown), joystick (1505), microphone (1506), scanner (1507), and camera (1508).

Computer system (1500) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1510), data-glove (not shown), or joystick (1505), but there can also be tactile feedback devices that do not serve as input devices), audio output devices (such as: speakers (1509), headphones (not depicted)), visual output devices (such as screens (1510) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted). These visual output devices (such as screens (1510)) can be connected to a system bus (1548) through a graphics adapter (1550).

Computer system (1500) can also include human accessible storage devices and their associated media such as optical media including CD/DVD ROM/RW (1520) with CD/DVD or the like media (1521), thumb-drive (1522), removable hard drive or solid state drive (1523), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1500) can also include a network interface (1554) to one or more communication networks (1555). The one or more communication networks (1555) can for example be wireless, wireline, optical. The one or more communication networks (1555) can further be local, wide-area, metropolitan, vehicular and industrial, real-time, delay-tolerant, and so on. Examples of the one or more communication networks (1555) include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1549) (such as, for example USB ports of the computer system (1500)); others are commonly integrated into the core of the computer system (1500) by attachment to a system bus as described below (for example Ethernet interface into a PC computer system or cellular network interface into a smartphone computer system). Using any of these networks, computer system (1500) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1540) of the computer system (1500).

The core (1540) can include one or more Central Processing Units (CPU) (1541), Graphics Processing Units (GPU) (1542), specialized programmable processing units in the form of Field Programmable Gate Areas (FPGA) (1543), hardware accelerators for certain tasks (1544), graphics adapters (1550), and so forth. These devices, along with Read-only memory (ROM) (1545), Random-access memory (1546), internal mass storage (1547) such as internal non-user accessible hard drives, SSDs, and the like, may be connected through the system bus (1548). In some computer systems, the system bus (1548) can be accessible in the form of one or more physical plugs to enable extensions by additional CPUs, GPU, and the like. The peripheral devices can be attached either directly to the core's system bus (1548), or through a peripheral bus (1549). In an example, the screen (1510) can be connected to the graphics adapter (1550). Architectures for a peripheral bus include PCI, USB, and the like.

CPUs (1541), GPUs (1542), FPGAs (1543), and accelerators (1544) can execute certain instructions that, in combination, can make up the aforementioned computer code. That computer code can be stored in ROM (1545) or RAM (1546). Transitional data can be also be stored in RAM (1546), whereas permanent data can be stored for example, in the internal mass storage (1547). Fast storage and retrieve to any of the memory devices can be enabled through the use of cache memory, that can be closely associated with one or more CPU (1541), GPU (1542), mass storage (1547), ROM (1545), RAM (1546), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1500), and specifically the core (1540) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1540) that are of non-transitory nature, such as core-internal mass storage (1547) or ROM (1545). The software implementing various embodiments of the present disclosure can be stored in such devices and executed by core (1540). A computer-readable medium can include one or more memory devices or chips, according to particular needs. The software can cause the core (1540) and specifically the processors therein (including CPU, GPU, FPGA, and the like) to execute particular processes or particular parts of particular processes described herein, including defining data structures stored in RAM (1546) and modifying such data structures according to the processes defined by the software. In addition or as an alternative, the computer system can provide functionality as a result of logic hardwired or otherwise embodied in a circuit (for example: accelerator (1544)), which can operate in place of or together with software to execute particular processes or particular parts of particular processes described herein.

Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. An apparatus for event detection of passive seismic data, the apparatus comprising:
    processing circuitry configured to:
        extract features from the passive seismic data based on a backbone subnetwork of a residual deep neural network;
        adjust parameters of the backbone subnetwork based on the extracted features;
        generate bounding box proposals for a region of interest (ROI) in the passive seismic data based on the extracted features being input to a region proposal network of the residual deep neural network;
        classify the bounding box proposals into two groups, each bounding box proposal in a first group indicating that a corresponding seismic signal presents in the ROI, each bounding box proposal in a second group indicating that no seismic signal presents in the ROI; and
        determine at least one seismic signal in the ROI from the first group of bounding box proposals.

2. The apparatus of claim 1, wherein the processing circuitry is further configured:
    flipping each bounding box proposal in the first group in one of a horizontal direction or a vertical direction along with the respective bounding box proposal.

3. The apparatus of claim 1, wherein the processing circuitry is further configured:
    de-noise the at least one seismic signal based on an infinite impulse response (IIR) Wiener filter based de-noising method.

4. The apparatus of claim 1, wherein the processing circuitry is further configured:
    increase a size of each bounding box proposal in the first group along a diagonal associated with a seismic signal detected inside the respective bounding box proposal, an aspect ratio of each bounding box proposal being kept as constant during the increasing the size of the respective bounding box proposal.

5. The apparatus of claim 1, wherein the processing circuitry is further configured:
    generate synthetic seismic data based on a Ricker wavelet;
    train the residual deep neural network based on a portion of the synthetic seismic data; and
    test the residual deep neural network based on a remaining portion of the synthetic seismic data.

6. The apparatus of claim 5, wherein the processing circuitry is further configured:
    add random noise to the remaining portion of the synthetic seismic data to generate noisy synthetic seismic data; and
    test the residual deep neural network based on the noisy synthetic seismic data.

7. An apparatus for event detection of passive seismic data, the apparatus comprising:
    processing circuitry configured to:
        extract features from the passive seismic data based on a backbone subnetwork of a residual deep neural network;
        generate bounding box proposals for a region of interest (ROI) in the passive seismic data based on the extracted features being input to a region proposal network of the residual deep neural network;
        classify the bounding box proposals into two groups, each bounding box proposal in a first group indicating that a corresponding seismic signal presents in the ROI, each bounding box proposal in a second group indicating that no seismic signal presents in the ROI;
        flip each bounding box proposal in the first group in one of a horizontal direction or a vertical direction along with the respective bounding box proposal; and
        determine at least one seismic signal in the ROI from the first group of bounding box proposals.

8. The apparatus of claim 7, wherein the processing circuitry is further configured:
    de-noise the at least one seismic signal based on an infinite impulse response (IIR) Wiener filter based de-noising method.

9. The apparatus of claim 7, wherein the processing circuitry is further configured:
    increase a size of each bounding box proposal in the first group along a diagonal associated with a seismic signal detected inside the respective bounding box proposal, an aspect ratio of each bounding box proposal being kept as constant during the increasing the size of the respective bounding box proposal.

10. The apparatus of claim 7, wherein the processing circuitry is further configured:
    generate synthetic seismic data based on a Ricker wavelet;
    train the residual deep neural network based on a portion of the synthetic seismic data; and
    test the residual deep neural network based on a remaining portion of the synthetic seismic data.

11. The apparatus of claim 10, wherein the processing circuitry is further configured:
    add random noise to the remaining portion of the synthetic seismic data to generate noisy synthetic seismic data; and
    test the residual deep neural network based on the noisy synthetic seismic data.

* * * * *